(No Model.) 4 Sheets—Sheet 1.
A. STUCKI.
AUTOMATIC REVERSING VALVE FOR STEAM HEATING SYSTEMS.
No. 582,324. Patented May 11, 1897.
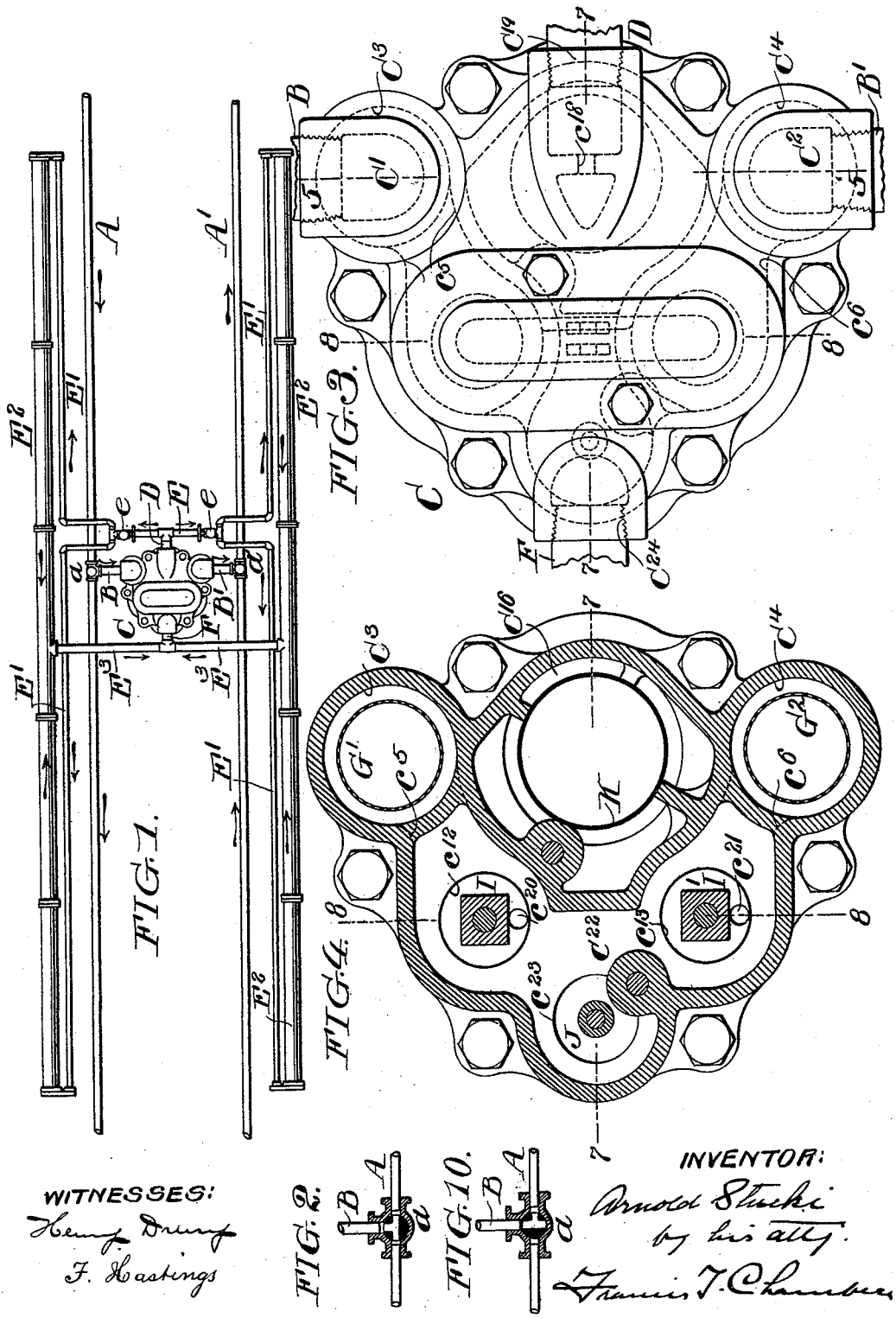
WITNESSES:
INVENTOR:
Arnold Stucki
by his atty.

(No Model.) 4 Sheets—Sheet 2.
A. STUCKI.
AUTOMATIC REVERSING VALVE FOR STEAM HEATING SYSTEMS.
No. 582,324. Patented May 11, 1897.
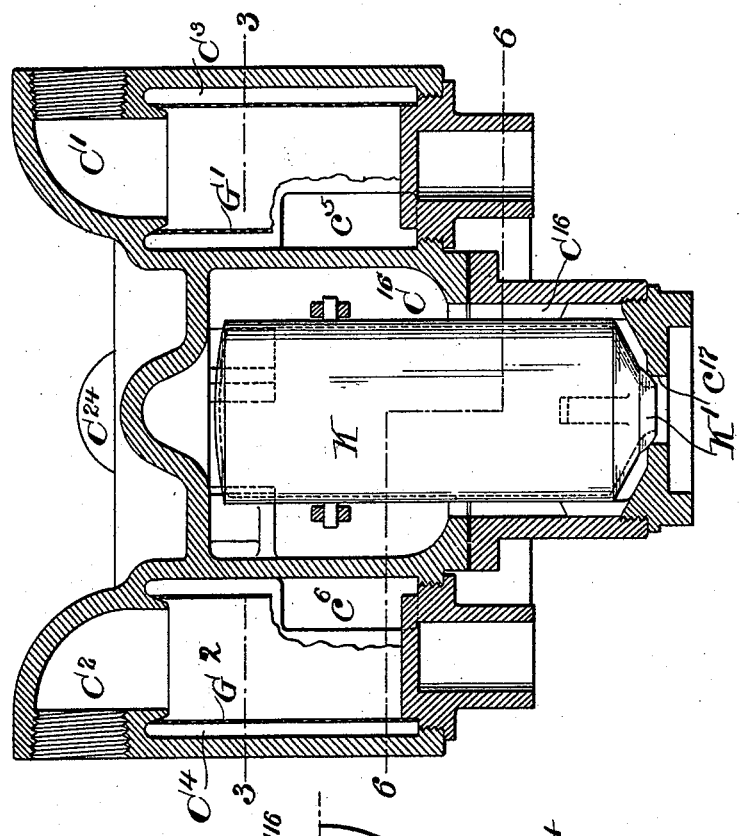
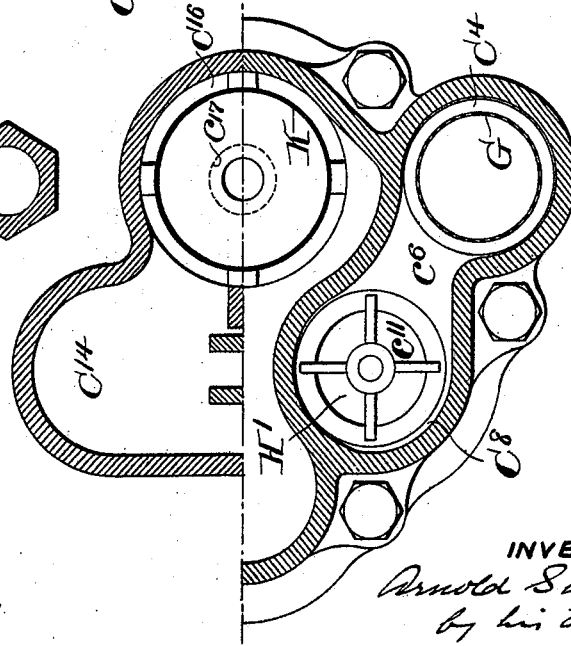
WITNESSES:
INVENTOR:
Arnold Stucki (No Model.) 4 Sheets—Sheet 3.
A. STUCKI.
AUTOMATIC REVERSING VALVE FOR STEAM HEATING SYSTEMS.
No. 582,324. Patented May 11, 1897.
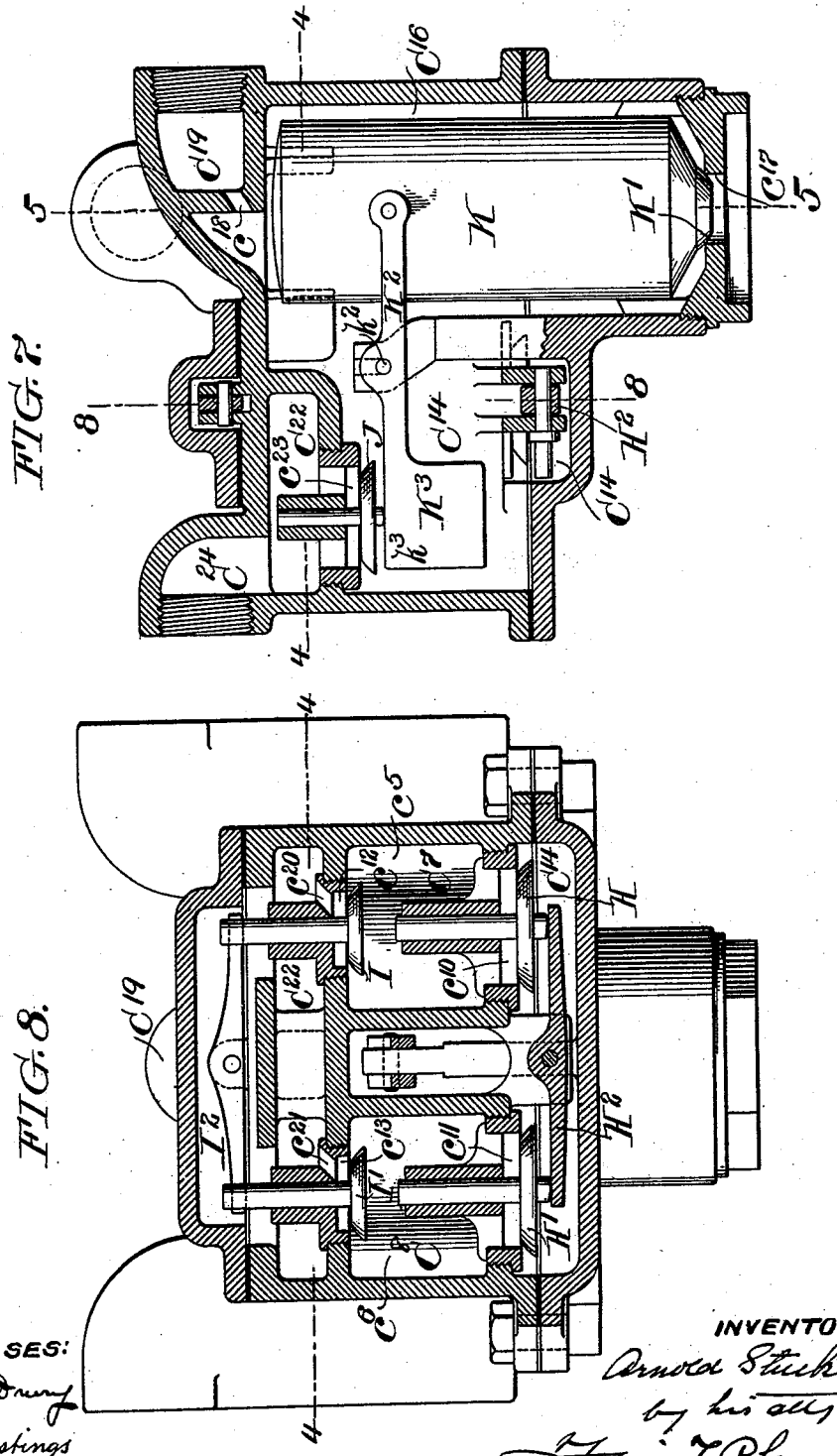
WITNESSES:
Henry Drury
F. Hastings
INVENTOR:
Arnold Stucki
by his atty.
Francis T. Chambers (No Model.)
4 Sheets—Sheet 4.
A. STUCKI.
AUTOMATIC REVERSING VALVE FOR STEAM HEATING SYSTEMS.
No. 582,324.
Patented May 11, 1897.
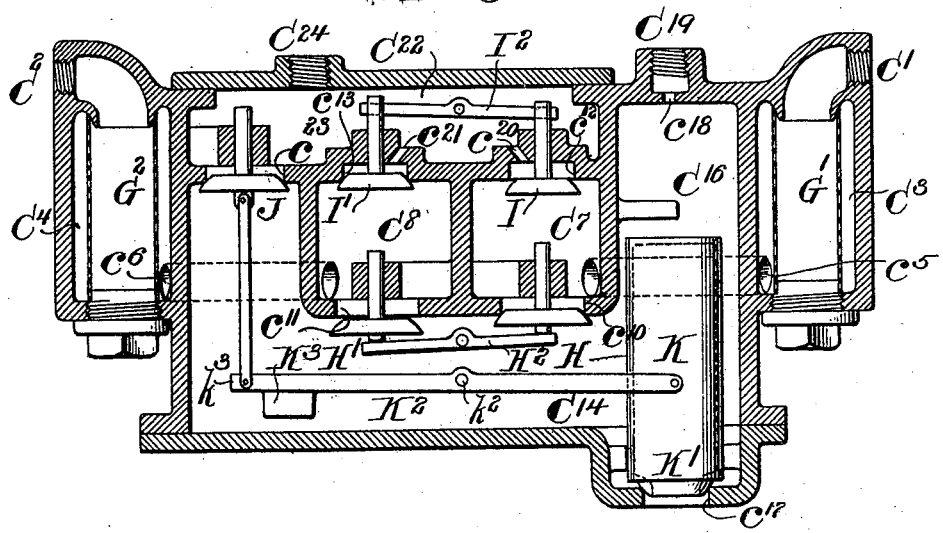
WITNESSES:
INVENTOR:

UNITED STATES PATENT OFFICE.

ARNOLD STUCKI, OF ALTOONA, PENNSYLVANIA.

AUTOMATIC REVERSING-VALVE FOR STEAM-HEATING SYSTEMS.

SPECIFICATION forming part of Letters Patent No. 582,324, dated May 11, 1897.

Application filed July 25, 1894. Serial No. 518,527. (No model.)

*To all whom it may concern:*

Be it known that I, ARNOLD STUCKI, a citizen of the Republic of Switzerland, residing in Altoona, in the county of Blair, in the State of Pennsylvania, have invented a certain new and useful Improvement in Automatic Reversing-Valves for Steam-Heating Systems, of which the following is a true and exact description, reference being had to the accompanying drawings, which form a part thereof.

My invention relates to a steam-heating system for railway-cars, and particularly to an automatic reversing-valve therefor.

The invention will be best understood as explained in connection with the accompanying drawings, which illustrate reversing-valves constructed according to my invention, and in which—

Figure 1 is a plan view of the radiator system of the steam and return pipes and reversing-valve fitting in a car. Fig. 2 is a detail view of one of the three-way cocks, showing the position it occupies in all but the last car of the train. Fig. 3 is a plan view, on an enlarged scale, of the reversing-valve fitting shown in Fig. 1. Fig. 4 is a sectional plan view on the line 4 4 of Figs. 7 and 8. Fig. 5 is a sectional view taken on the line 5 5 of Figs. 3 and 7, looking from the rear of these figures. Fig. 6 is a horizontal section taken on the line 6 6 of Fig. 5. Fig. 7 is a central vertical section taken on the line 7 7 of Figs. 3 and 4. Fig. 8 is a section taken on the line 8 8 of Fig. 7, looking from the front. Fig. 9 is a view, somewhat distorted, showing all the operative parts of the valve within the fitting illustrated in Figs. 3 to 8, inclusive, in somewhat different positions, so that the operations may be more easily understood. Fig. 10, Sheet 1, shows the three-way cock illustrated in Fig. 2 in the position it occupies on the last car of the train.

Referring to Fig. 1, A A' are the train-pipes, either one of which may be the supply-pipe for steam, according as to how the car is coupled up, the other being the pipe for the return of the steam. Steam is obtained from any suitable source, usually through a reducing-valve from the boiler of the locomotive, and it is customary to connect the return-pipes of a train to a pump, so that it will not be necessary to employ a considerable pressure to force the steam through the system back into the return-pipe. This pump, however, may obviously be dispensed with, if desired.

B B' are pipe connections leading from the train-pipes A A' to fitting C, $a$ $a'$ being three-way cocks which are normally in the position shown in Fig. 2.

C is my reversing-valve fitting, from which leads a pipe D, which connects the same by means of suitable branches E E' to the radiators, which I have indicated at $E^2$ $E^2$, $e$ $e$ being suitable valves in these branch pipes.

$E^3$ $E^3$ are pipes leading from the radiators back to the valve-fitting C, entering it at F.

By the term "radiators" or "radiator system" it is to be understood that I mean not only drums or coils in the cars through which the steam passes, heating the cars directly, but also any conduit or coil, such as is used in water or air heating systems, where the steam which passes through the coils or conduits heats the circulating medium, as air or water, which travels through and heats the car.

The construction of the valve-fitting may of course vary greatly as to details.

As shown in Figs. 3 to 8, valve-fitting C is provided with four main ports, two of which, $C'$ $C^2$, connect with the train-pipes A A', respectively, a third, $C^{19}$, connects the fitting to the pipe which leads to the radiator system, and the other, $C^{24}$, to the pipe, as $E^3$, which leads back from the radiator system to the fitting. The flow of steam into the chamber $C^{14}$ in the fitting through the ports $C'$ $C^2$ is controlled by valves H H', here shown as clack-valves, which open inwardly. A chamber or passage $C^{22}$ leads from the port $C^{24}$ with which the return-pipe $E^3$ connects to ports which are controlled by the valves I I'. If the train-pipe which connects with the port $C^2$ is the supply-pipe, valve H' will open, and the valves H and I' will be closed by the pressure of the steam, which will flow through the open ports $C^2$ $C^{19}$ to the radiators and back into the fitting through port $C^{24}$. The pressure of the steam after its passage through the radiator system will not be sufficient to balance the pressure in the supply-pipe, and therefore the valves H and I' will remain closed. The steam will, however, open the valve I and flow into and through the return train-pipe which connects with the port $C'$. If, now, the car is coupled up by its other end and the pipe which was before the return-pipe becomes the supply-pipe, the valves will automatically reverse and the flow of steam will be through the ports $C'$ $C^{19}$, through the radiators, and back through ports $C^{24}$ and $C^2$ to and through the return-pipe.

To drain off the accumulation of water of condensation and prevent its passing through the return-pipe of the system, I also provide the apparatus with a ground or drain valve $K'$.

J is a valve which controls a passage $c^{23}$, which connects the port $c^{24}$, which leads from the radiator system, with the discharge-port governed by the valve $K'$. This valve J is shown controlling the passage leading into the chamber $C^{14}$, which is filled with steam from the supply-pipe, which when the pressure is on keeps both valves J and $K'$ closed except when an undue accumulation of water occurs in the chamber $C^{14}$, as will be presently explained. When steam is turned off, any accumulated drip in the chamber $C^{22}$ or the shutting off of pressure in the chamber $C^{14}$ will open the valve J, and the drip will flow to the discharge through the valve $K'$, as indicated. I also prefer to make the valve $K'$ automatic, so that it will open on an undue accumulation of water in the chamber $C^{14}$, even if the steam-pressure is on. This can be accomplished in any suitable manner, as by providing a float (indicated at K) to raise the valve and open the discharge-port. I thus provide for draining off the water of condensation that accumulates in the supply-pipe and the chamber $C^{14}$ of the valve-fitting before the steam reaches the radiators, as well as that forming in the radiators and coming from them into the fitting, and this may be done at will by turning off the steam-pressure or automatically during the operation of the system by the rising of the float-valve $K'$, causing the valve J to open the port $c^{23}$ and drain the radiators into the chamber $C^{14}$, which it is to be noted is the same chamber where the condense-water from the supply-pipe accumulates. The drain-valve has therefore two capabilities of operation—that is to say, it will open automatically when the steam-pressure in the chamber $C^{14}$ is shut off, or it may be opened while the steam-pressure is on by the accumulation of water raising the float, and in either case it will drain not only the chamber $C^{14}$, but any condense-water there may be in the chamber $C^{22}$ on the other side of the valve J.

The different forms of fittings shown herein have valves which operate under steam-pressure to open the proper passages to direct the steam from the pipe which happens to be the supply-pipe through the radiator system to the return train-pipe and preferably also, in addition, to automatically operate the discharge-valve.

The construction which I have illustrated in Figs. 3 to 8 is a very convenient form of reversing-valve. In Fig. 9 the arrangement of the parts is, for the sake of rendering their manner of operation more clear, somewhat changed from that of the valve shown in Figs. 3 to 8. Correspondingly-lettered parts correspond exactly, however, in function.

In all the figures, $C'$ $C^2$ are the ports connecting the apparatus with the train-pipes A A', respectively.

$C^{14}$ is the chamber into which the steam flows from that one of the train-pipes through which steam is supplied to the heating system, and H H' are the valves which direct the flow of the steam.

The ports $C'$ $C^2$ open first into chambers $C^3$ $C^4$, in which I preferably arrange strainers $G'$ $G^2$ to act as separators for the steam. From the chambers $C^3$ $C^4$ lead passages $c^5$ $c^6$ to the chambers $C^7$ $C^8$. The valves H H' open outwardly from the chambers $C^7$ $C^8$, respectively, into the chamber $C^{14}$, controlling the ports $c^{10}$ $c^{11}$, and from this chamber steam flows through the passage $C^{19}$ to the radiator systems. The steam from the radiators returns to the valves through the port $C^{24}$ into the chamber $C^{22}$. Valves I I' open from the chamber $C^{22}$ inwardly into the chambers $C^7$ $C^8$, controlling ports $c^{12}$ $c^{13}$.

In order to insure prompt action by the valves H H' and I I', I prefer to balance them. This can very readily be done by connecting the valves together by a suitable lever, as shown, so that the weight of one will counterbalance the other, $H^2$ indicating such a lever for the valves H H', and $I^2$ a similar lever for the valves I I'. This connecting of the valves together is of great importance, for the reason that these heating systems are necessarily of the low-pressure sort, and in the last car of a train, especially where the trains are long, the pressure is so slight that valves of the kind heretofore in use are unsatisfactory from the start and soon become altogether inoperative. By connecting the valves together so that the weight of one counterbalances that of the other they are found to operate promptly and easily under the smallest obtainable pressure. It is also important, considering the valves H and H', for example, that the one farthest from the supply should be closed simultaneously with the opening of the one that for the time being is acting as the admission-valve, for otherwise pressure accumulates in the chamber of the casing and the steam squeezes itself between the other valve and its seat, thereby often requiring more pressure to seat them than is actually available, at least at the start. The connecting of the valves together as I have done not only counterbalances them but also obviates this difficulty, since the valve controlling the return-opening into the chamber of the casing closes immediately upon the opening of the one controlling the admission-port and before the steam passes to the radiators, so that no pressure can accumulate that would obstruct the closing of the first-named valve. I also prefer to connect the valve J and the drain-valve $K'$, and, as shown, $K^2$ is a lever pivoted at $k^2$ and connected at one end to the valve K′ and at the other to the valve J, which controls the port $c^{23}$. I also prefer to arrange a float in the manner shown to open the valve K′ when an undue accumulation of water occurs while the steam is on and the system is in operation, and the weight of this float can also be supported by the lever $K^2$, a counterbalance - weight being secured at $K^3$, if necessary. It is preferable that the weight on the end $k^3$ of the lever be slightly greater than that on the other end, so as to insure the prompt opening of the valves K′ and J when the steam-pressure is removed, as well as its prompt action upon the accumulation of water in the chamber $C^{14}$ during the working of the system. In this figure I have also illustrated a restricted orifice or passage $c^{18}$, arranged in the passage $C^{19}$, through which the steam must pass in flowing from the reversing-valve casing to the radiator system. The effect of passing the steam through this restricted orifice is to prevent it passing readily from the supply to the return pipe in the first car or cars of a train and to compel it to pass to the other cars. To increase this effect, similar orifices may be arranged at $c^{20}$ $c^{21}$, through which the steam must pass in flowing from the chamber $C^{22}$ to the chambers $C^7$ $C^8$.

The arrangement shown in Figs. 2 to 8 is much more compact than that shown in Fig. 9. The ports C′ $C^2$ are arranged one on each side of a circular well $C^{16}$, which forms part of the chamber $C^{14}$ and in which the float K is guided. The chambers $C^7$ $C^8$ are to the front of the entrance-chambers $C^3$ $C^4$, and are connected by means of the ports $c^{10}$ $c^{11}$ to the chamber $C^{14}$ and by means of the ports $c^{20}$ $c^{21}$ to the return-chamber $C^{22}$. The valve J is arranged in front of and between the chambers $C^7$ $C^8$.

In the position of the valves shown in Fig. 9 the steam is entering through passage $C^3$, passage $c^6$, and through port $c^{11}$ into the chamber $C^{14}$, whence it passes into the radiator system through the small orifice $c^{18}$ in the port $C^{19}$. Returning into the reversing-valve casing through the port $C^{24}$, the steam flows through the passage $c^{12}$ into the chamber $C^7$, and thence through the passage $c^5$ and the port C′ to the return train-pipe. The pressure of the steam in the supply-pipe will keep the valves I′, H, J, and K′ closed. When the steam-pressure is off, the drain-valve K′ will open to permit the escape of the water of condensation and the valve J will also open to permit whatever water is in the chamber $C^{22}$ to escape to the discharge-port $c^{17}$. It will also be noted that by connecting the valves H H′ and I I′ together by levers, as shown, not only will the weights of the valves be counterbalanced, but the pressure of the steam as it comes from the supply-pipe will act positively to open the valve which controls the passages through which the return steam from the radiators flows into chamber $C^7$ or $C^8$.

The construction illustrated and described shows how entirely independent of any care or manipulation the apparatus may be, there being no need of any alterations in any of the valves on cars in the middle of a train. On the last car of a train the three-way cocks $a$ $a$ should be turned to the position indicated in Fig. 10, so as to prevent the steam from blowing out of the end of the train-pipes. This is the only manipulation required when a train is made up, the reversing-valve automatically providing the proper path for the steam and relieving the system of any water of condensation when the steam is turned off, and also, when a float is employed, from an undue amount of water even if the pressure is on.

It is of course perfectly evident that various other constructions differing in details from that herein shown could be easily gotten up, and I do not wish to be considered as limiting myself in any way to the particular devices shown. It will also be noted that instead of employing a float to operate the discharge-valve I may, if desired, employ its well-known equivalent—an expansion rod or tube.

Having now described my invention, what I claim as new, and desire to secure by Letters Patent, is—

1. In a steam-heating system for cars having double train-pipes, the combination with said pipes and the radiator system, of a valve-casing communicating with each train-pipe, said casing containing valves located and adapted to control its communication with each of the train-pipes, and a connection between said valves, whereby when the steam enters the casing from one of said pipes the communication between said casing and the other pipe will be closed.

2. In a steam-heating system for cars having double train-pipes, the combination with said pipes and the radiator system, of a valve-casing having passages communicating with each train-pipe, a passage leading to the radiators, a passage leading from the radiators, and pressure-actuated valves controlling said passages, the valves controlling the passage of steam from one train-pipe through the casing being connected to the valve that controls the passage of steam from the casing to the other train-pipe, so that one of said valves is normally open and the other closed, and so that said valves are counterbalanced and positively actuated in opposite directions.

3. In a steam-heating system for cars having double train-pipes, the combination with said pipes and the radiator system, of a valve-casing having independent chambers communicating respectively with the train-pipes, a chamber with which each of said train-pipe chambers communicates, valves opening outwardly from the train-pipe chambers and controlling said communication, and a connection between said valves so that one of said valves is normally open and the other closed, and so that they are counterbalanced and arranged to be actuated positively and simultaneously in opposite directions.

4. In a steam-heating system for cars having double train-pipes, the combination with said pipes and the radiator system, of a valve-casing having passages communicating with each train-pipe and other passages leading to and from the radiator system, whereby the steam passes into the casing from one train-pipe, through the casing to the radiators and back into and through the casing again to the other train-pipe, valves in said casing controlling the passage of steam from one train-pipe through the casing to the radiators, and other valves in said casing controlling the passage of steam from the radiators through the casing to the other train-pipe, those valves that control the passage of steam from and into the respective train-pipes being connected together, and those valves controlling the passage of steam into and from the radiators being also connected together, the connection between the individuals of each set of said valves being such that each is counterbalanced and adapted to be positively and simultaneously actuated in the opposite direction and by the other.

5. In a steam-heating system for cars having double train-pipes, the combination with said pipes and the radiator system, of a valve-casing having a passage communicating with each train-pipe, a passage leading to the radiators, a passage leading from the radiators, pressure-actuated valves controlling said passages, a drain-port, and a valve controlling said port, said valve being constructed and arranged to be normally closed when the system is in operation, and to be opened by the accumulation of water in the casing while the steam is on.

6. In a steam-heating system for cars having double train-pipes, the combination with said pipes and the radiator system, of a valve-casing having a chamber, passages connecting said chamber with each train-pipe, a passage leading to the radiator, a passage leading from the radiator, pressure-actuated valves controlling said passages, a drain-port leading from said chamber to the ground, and a valve located in said chamber and controlling the port, said valve being arranged to be acted on by the pressure of steam passing through the casing and the passages connecting it with the train-pipe and radiators.

7. In a steam-heating system for cars having double train-pipes, the combination with said pipes and the radiator system, of a valve-casing having passages communicating with each train-pipe, a passage leading from the radiators, a valve controlling this passage, a drain-port opening to the ground, and a drain-valve controlling the port, said valves being connected together so that they are simultaneously opened and closed, and being also arranged and adapted to be closed by the pressure of steam passing through the casing and opened automatically when the pressure is exhausted.

8. In a steam-heating system for cars having double train-pipes, the combination with said pipes and the radiator system, of a valve-casing, chambers in said casing communicating respectively with the train-pipes, a chamber leading to the radiators, a chamber communicating with the return-pipe from the radiators, each of said train-pipe chambers having passages communicating with the train-pipes and the radiator-chambers and controlled by inwardly and outwardly opening valves, the outwardly-opening valves being connected together and the inwardly-opening valves being also connected together, whereby all of said valves are counterbalanced and arranged and adapted to be operated by the pressure in the valve-casing.

9. In a steam-heating system for cars having double train-pipes, the combination with said pipes and the radiator system, of a valve-casing having passages communicating with each train-pipe, a chamber communicating with the radiators, a drain-port in said chamber, a chamber communicating with the return-pipe of the radiators, a passage between this return-pipe chamber and the chamber having the drain-port, an outwardly-opening valve controlling the passage from the return-pipe chamber, and an inwardly-opening valve controlling the drain-port, said valves being connected together for simultaneous operation, and being adapted to close together by steam-pressure in the casing and to open together automatically when the pressure is removed and being also constructed and adapted to be opened by the accumulation of water in the casing while the pressure is on.

10. In a steam-heating system for cars having double train-pipes, the combination with said pipes and the radiator system, of a valve-casing having chambers communicating respectively to each train-pipe, a chamber communicating with the delivery-pipe of the radiator system, a communication between said chamber and both of the train-pipe chambers, a discharge-port in the chamber from which the delivery-pipe of the radiator system leads, a fourth chamber, as $C^{22}$, into which the radiator return-pipe leads, passages leading from the chamber $C^{22}$ to each of the train-pipe chambers and to the chamber communicating with the radiator delivery-pipe, valves H, H', opening outwardly from the train-pipe chambers into the radiator-delivery-pipe chamber, means connecting said valves together so that each is positively actuated by and in the opposite direction to the other, valves I, I', opening inwardly into the train-pipe chambers from the chamber $C^{22}$, and means connecting said valves I, I', together, so that each will actuate the other in the opposite direction to its movements, an inwardly-opening valve J arranged in the radiator-delivery-pipe chamber in the opening leading from the chamber $C^{22}$, and an inwardly-opening valve K' arranged to control the drain-port.

11. In a steam-heating system for cars having double train-pipes, the combination with said pipes and the radiator system, of a valve-casing having separate chambers communicating with each train-pipe, a chamber, as $C^{14}$, communicating with the radiator-system delivery-pipe, a communication between said chamber and both of the train-pipe chambers, a drain-port in the chamber $C^{14}$, a fourth chamber, as $C^{22}$, into which the radiator return-pipe leads, passages leading from the chamber $C^{22}$ to each of the train-pipe chambers and to the chamber $C^{14}$, valves H, H', opening outward from the train-pipe chambers into the chamber $C^{14}$, means connecting said valves together so that each positively actuates the other in the opposite direction, valves I, I', opening inwardly into the train-pipe chambers from the chamber $C^{22}$, and means connecting said valves I, I', together so that each will actuate the other in the opposite direction, an inwardly-opening valve J in the chamber $C^{14}$, controlling the passage leading from the chamber $C^{22}$, an inwardly-opening valve K' controlling the drain-port in the chamber $C^{14}$, and means whereby the valves J and K' are coupled together and made to operate simultaneously.

12. In a steam-heating system for cars having double train-pipes, the combination with said pipes and the radiator system, of a valve-casing having separate chambers communicating with each train-pipe, a strainer in the connecting-passages between the train-pipes and the chambers, a chamber $C^{14}$ communicating with the delivery-pipe leading to the radiator system, and to both the train-pipe chambers, the communication between the chamber $C^{14}$ and the delivery-pipe being provided with means for regulating the passage of steam, a communication between the chamber $C^{14}$ and a drain-port, a chamber $C^{22}$ into which the return-pipe of the radiator system leads, passages connecting this chamber with each of the train-pipe chambers, a passage $c^{23}$ connecting the chambers $C^{22}$ and $C^{14}$, counterbalanced valves H, H', opening outwardly from the train-pipe chambers into the chamber $C^{14}$, valves I, I', opening outward from the chamber $C^{22}$ to said train-pipe chambers, an inwardly-opening valve K' controlling the drain-port, and a valve J adapted to control the passage $c^{23}$.

13. In a steam-heating system for cars having double train-pipes, the combination with said pipes and the radiator system, of a valve-casing having a chamber provided with passages leading to each train-pipe, a passage leading to the radiators, a passage leading from the radiators, and vertically-operating pressure-actuated valves controlling said passages, the valve controlling the passage of steam from one train-pipe into the chamber opening inwardly into said chamber and being connected to the valve that controls the passage of steam from said chamber to the other train-pipe, which valve also opens inwardly into said chamber, whereby said valves are counterbalanced and the valve that controls the passage of steam from the chamber is positively actuated by the movement of the valve that controls the passage of steam into the chamber.

14. In a steam-heating system for cars having double train-pipes, the combination with said pipes and the radiator system, of a valve-casing having a chamber provided with passages leading to each train-pipe, a passage leading to the radiators, and a passage leading from the radiators, with vertically-operating pressure-actuated valves controlling said passages, the valves controlling the passage of steam from one train-pipe into the chamber and from the chamber to the other train-pipe being mechanically connected together so as to move simultaneously in opposite directions, and both opening inwardly into said chamber, whereby said valves are counterbalanced and either is adapted to be opened and held open by the passage of steam into the chamber from one of the train-pipes, and the other is adapted to be closed and held closed by the movement of the other independently of the steam-pressure.

15. In a steam-heating system for cars having double train-pipes, the combination with said pipes and the radiator system, of a valve-casing having a main chamber with which each of the train-pipes has indirect communication, separate chambers communicating directly with said train-pipes, respectively, and both communicating with the first-named chamber, vertically-operating pressure-actuated valves opening outwardly with respect to the separate chambers and controlling communication between them and the main chamber, and a mechanical connection between said valves, whereby they are counterbalanced and arranged to be actuated positively and simultaneously in opposite directions.

16. In a steam-heating system for cars having double train-pipes, the combination with said pipes and the radiator system, of a valve-casing having a chamber in communication with the radiator return-pipe, separate chambers arranged side by side horizontally and vertically operating communicating with said return-pipe chamber, pressure-actuated valves controlling said communications, said valves opening inwardly with respect to the separate chambers and moving in different vertical planes to open and close, and a mechanical connection between the valves, whereby they are counterbalanced and arranged to be actuated positively and simultaneously one by the movement of the other.

ARNOLD STUCKI.

Witnesses:
W. J. HAMOD,
J. H. WILKINS.